(12) United States Patent
Ahn et al.

(10) Patent No.: US 9,098,518 B2
(45) Date of Patent: Aug. 4, 2015

(54) RESOURCE SHARING METHOD AND SYSTEM

(75) Inventors: Jae-min Ahn, Seoul (KR); Ji-yon Han, Seoul (KR); Jeong-hwa Song, Suwon-si (KR); U-ram Yoon, Seoul (KR); Keon-il Jeong, Seongnam-si (KR); Eo-hyung Lee, Seoul (KR); Kyung-lang Park, Seoul (KR); Shin-dug Kim, Goyang-si (KR)

(73) Assignees: Samsung Electronics Co., Ltd., Suwon-si (KR); Industry-Academic Cooperation Foundation Yonsei University, Seoul (KR)

( * ) Notice: Subject to any disclaimer, the term of this patent is extended or adjusted under 35 U.S.C. 154(b) by 17 days.

(21) Appl. No.: 12/379,688

(22) Filed: Feb. 26, 2009

(65) Prior Publication Data
US 2009/0222528 A1 Sep. 3, 2009

(30) Foreign Application Priority Data

Feb. 29, 2008 (KR) ........................ 10-2008-0019189

(51) Int. Cl.
*G06F 17/30* (2006.01)
*H04L 29/08* (2006.01)

(52) U.S. Cl.
CPC .... *G06F 17/30094* (2013.01); *G06F 17/30206* (2013.01); *G06F 17/30209* (2013.01); *H04L 67/104* (2013.01); *H04L 67/1093* (2013.01)

(58) Field of Classification Search
CPC ........ H04L 67/104–67/1093; G06F 17/30206; G06F 17/30209; G06F 17/30094

USPC ........ 709/201–205, 217–219, 223, 226, 243; 707/636, 711, 750
See application file for complete search history.

(56) References Cited

U.S. PATENT DOCUMENTS

| | | | | |
|---|---|---|---|---|
| 5,745,602 A * | 4/1998 | Chen et al. | .................... | 382/229 |
| 7,206,934 B2 * | 4/2007 | Pabla et al. | .................... | 713/168 |
| 7,571,251 B2 * | 8/2009 | Bowman | ....................... | 709/242 |
| 7,644,150 B1 * | 1/2010 | Nucci et al. | ................... | 709/223 |
| 7,657,597 B2 * | 2/2010 | Arora et al. | ................... | 709/206 |
| 7,702,680 B2 * | 4/2010 | Yih et al. | ...................... | 707/738 |
| 7,711,737 B2 * | 5/2010 | Surendran | .................... | 707/748 |
| 8,139,483 B2 * | 3/2012 | Bauer et al. | ............... | 370/230.1 |
| 2003/0208621 A1 | 11/2003 | Bowman | | |

(Continued)

OTHER PUBLICATIONS

Yoon, Uram H., "Reducing the Discovery overheads in a DHT based P2P network by using Virtual Resources", Department of Computer Science, Yonsei University pp. 1-8, Aug. 19-21, 2008.

(Continued)

*Primary Examiner* — Gregory Todd
(74) *Attorney, Agent, or Firm* — NSIP Law

(57) ABSTRACT

A resource sharing method for a resource sharing system for a plurality of edge peers that individually store a resource and a plurality of super peers that manage the plurality of edge peers or resource information including a name of the resource that includes at least one key word is provided. In the resource sharing system, the super peers distribute and manage resource information of the edge peers according to a key word. Therefore, if a resource is requested using part of a name of a resource desired by a certain edge peer, the super peer searches for resources including the resource desired by the edge peer. Therefore, a user of an edge peer may acquire a desired resource even using part of a name of a desired resource.

16 Claims, 12 Drawing Sheets

(56) References Cited

U.S. PATENT DOCUMENTS

| | | | |
|---|---|---|---|
| 2005/0114709 A1* | 5/2005 | Moore | 713/201 |
| 2007/0061320 A1 | 3/2007 | Surendran | |
| 2008/0195597 A1* | 8/2008 | Rosenfeld et al. | 707/5 |
| 2009/0222528 A1* | 9/2009 | Ahn et al. | 709/206 |

OTHER PUBLICATIONS

Korean Office Action issued in the Korean Intellectual Property Office on Feb. 24, 2014 in corresponding Korean Application No. 10-2008-0019189.

* cited by examiner

FIG.3A

```
//Keyword Exeracting

Start-prog
foreach key value in resource list
    get rid of stop words
    push each word into templist
end-for
foreach words in templist
    if a word is not in key value list
    push the word into key value list
    increase occurence counter for the word
end-for
sort key value list by occurrence counter
foreach words in key value list
    if words.occurence>given percentage
    mark the word
end-for
foreach marked word in key value list
    if a resources has matching word
        link actual resource with the word
End-for
End-prog
```

FIG.3B

```
//Publishing virtual resource
//P: a super node which is trying to
//Publishing virtual resource
//O: owner super node of pre-published
//virtual resource
//I: a super node which has the same
//index with hashed index
Start-prog
P hash key value of virtual resource
P connect to I
P submit publish query with key value On receiving publishing query I checks its
    virtual resource list
if a virtual resource with same key value exists
    in I's virtual resource list
    Transfer index of O to P
end-if
else
    save received key value in I's resouce list
end-else
if P received O's index
P prepare resource list related to virtual
    resource it was publishing
P connects O
    transfer all of P's list to O
End-if
End-prog
```

FIG.5A

```
//Relaying virtual resoure list

Start-prog
foreach entities of Super Nodes
    randomly push into VRLIST.superNode
end-for
foreach entities of virtual resource
    randomly push into VRLIST.vr
end-for foreach superNode in VRLIST
    connect to the suprtNode
    transfer all of VRLIST
end-for
End-prg
```

FIG.5B

```
//Processing received virtual resource list

Start-prog
foreach VRLIST received
    Extract node information
    if extracted Super Node is not in known
    Super Node list
        Add node information to known
        Super Node list
    end-if
    Extract virtual resource key value
    Add virtual resource ey word to known
    VR keywords
End-for
End-prg
```

RESOURCE SHARING METHOD AND SYSTEM

CROSS-REFERENCE TO RELATED APPLICATIONS

This application claims priority from Korean Patent Application No. 10-2008-0019189, filed on Feb. 29, 2008, the disclosure of which is incorporated herein in its entirety by reference.

BACKGROUND

1. Field

One or more embodiments within the following description relate to a resource sharing method and system, and more particularly, to a resource sharing system including a plurality of edge peers that can individually store a resource and a plurality of super peers that manage the edge peers and a resource sharing method thereof.

2. Description of the Related Art

As wired and wireless Internet technologies develop, resource sharing systems using the Internet have been appearing more frequently. Such resource sharing systems are utilizing peer-to-peer (P2P) as networking technology for sharing resources. The P2P includes a plurality of peers that are connected to each other via a network and can individually store resources. In the P2P, peers share the resources such as hardware, software and contents via the network.

P2P schemes include a hybrid P2P scheme and a pure P2P scheme. In the hybrid P2P scheme, peers are connected individually to a single central server and share resources through the central server. In the pure P2P scheme, peers are connected directly to each other to share resources.

However, the hybrid P2P scheme has a problem in that, since a load is concentrated on a central server, it is impossible to share the resources when the central server is or becomes inoperative. The pure P2P scheme has a problem in that it takes a long time to share resources since a request and a transmission of the resources are performed according to a tree format sequencing, with all transmissions of resources only being performed according to the tree format, e.g., up or down different branchings.

In order to resolve the above problems, a distributed hybrid P2P scheme has been developed. In the distributed hybrid P2P network, peers include edge peers that provide or receive resources and super peers that manage the edge peers. That is, in the distributed hybrid P2P scheme, the edge peers are connected individually to super peers connected to each other, and the edge peers share resources through at least one super peer.

However, a definite name of a corresponding resource is necessary to search for a desired resource in a distributed hybrid P2P scheme. That is, a super peer merely searches for a resource that has the same name as a search word. For this reason, if a certain edge peer requests a resource using part of a name of a desired resource, a super peer searches for a resource totally different from the resource desired by the edge peer. Therefore, a user cannot easily search for a desired resource in such a resource sharing system.

SUMMARY

According to one or more embodiments, there is provided a resource sharing method for a resource sharing system for a plurality of edge peers that individually store a resource and a plurality of super peers that manage the plurality of edge peers or resource information including a name of the resource that includes at least one key word, the method including classifying, by a first super peer, collected resource information according to a key word, for the resource information, when the resource information is collected, distributing, by the first super peer, the classified resource information according to the key word, and storing, by a second super peer, the distributed classified resource information when the distributed classified resource information is received by the second super peer.

According to one or more embodiments, there is provided a resource sharing method for a resource sharing system for a plurality of edge peers that individually store a resource and a plurality of super peers that manage the plurality of edge peers or resource information including a name of the resource that includes at least one key word, the method including transmitting, by a first super peer that manages a first edge peer, a resource request message including the key word to at least one second super peer that manages resource information including the key word when the resource request message is received from the first edge peer by the first super peer, transmitting, by the second super peer, the resource request message to at least one second edge peer that stores a resource of the resource information when the resource request message is received by the second super peer, and transmitting, by the second edge peer, the resource to the first edge peer when the resource request message is received by the second edge peer.

According to one or more embodiments, there is provided a resource sharing method for a resource sharing system for a plurality of edge peers that individually store a resource and a plurality of super peers that manage the plurality of edge peers or resource information including a name of the resource that includes at least one key word, the method including transmitting, by a super peer, a resource request message including a key word to at least one second edge peer that stores a resource corresponding to the resource information including the key word when a resource request message is received from a first edge peer by the super peer, and transmitting, by the second edge peer, the resource to the first edge peer when the resource request message is received by the second edge peer.

According to one or more embodiments, there is provided a resource sharing method for a resource sharing system for a plurality of edge peers that individually store a resource and a plurality of super peers that manage the plurality of edge peers or resource information including a name of the resource that includes at least one key word, the method including distributing and storing, by a super peer, resource information according to a key word when resource information is collected, transmitting, by the super peer, a resource request message including the key word to at least one second edge peer that stores a resource corresponding to the resource information including the key word when the resource request message is received from a first edge peer by the super peer, and transmitting, by the at least one second edge peer, the resource to the first edge peer when the resource request message is received by the at least one second edge peer.

According to one or more embodiments, there is provided a resource sharing system for a plurality of edge peers that individually store a resource and a plurality of super peers that manage the plurality of edge peers or resource information including a name of the resource that includes at least one key word, the system including a plurality of super peers that distribute and manage resource information according to a key word when the resource information is collected, a first edge peer that transmits a resource request message, for the resource information, including any one of corresponding key words to a super peer of the plurality of super peers, and at least one second edge peer that transmits a resource corresponding to the resource information including the key word to the first edge peer when the resource request message is received via the super peer by the at least one second edge peer, wherein the super peer transmits the resource request message to the respective at least one second edge peer that stores the resource when the resource request message is received by the super peer.

Additional aspects and/or advantages will be set forth in part in the description which follows and, in part, will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

These and/or other aspects and advantages will become apparent and more readily appreciated from the following description of the embodiments, taken in conjunction with the accompanying drawings of which:

FIGS. 3a and 3b show examples of pseudocodes to describe the resource information processing procedure according to an exemplary embodiment;

FIGS. 5a and 5b show examples of pseudocodes to describe the resource information updating procedure according to an exemplary embodiment;

DETAILED DESCRIPTION OF EMBODIMENTS

Figure 1:
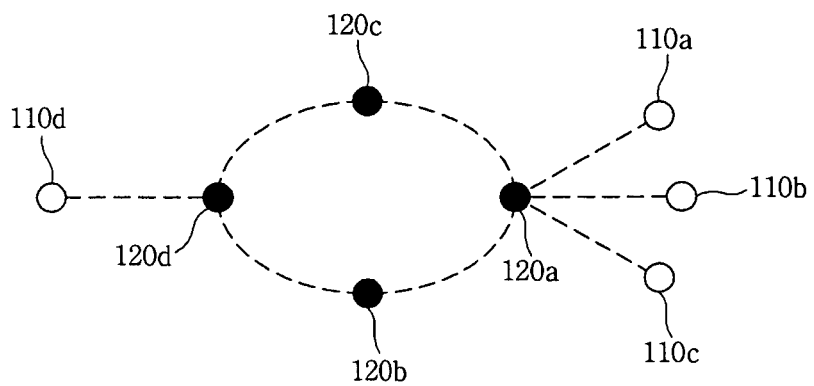
FIG. 1 is a schematic view illustrating a resource sharing system according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

In the below description, a term "resource" is used with a meaning that includes hardware, software, and contents. For example, a resource can include an MP3 file, an image file, a moving picture file, and so on. A term "resource name" means identification data of a corresponding resource to discriminate from other resources. The resource name includes at least one key word and can include a stop word. A term "key word" means a word that represents a characteristic element of a corresponding resource. A term "stop word" means a word that can be excluded from a characteristic element of a corresponding resource. A term "search word" means a word that is expected as a key word of a certain resource. That is, a search word can be the same as a key word. A term "resource information" means information specific to a certain resource. Resource information includes a resource name, an identification address of a location in which a resource is stored, and so on.

A term "peer" means a terminal that makes up a resource sharing system. A mobile communication terminal such as a mobile phone or a laptop computer, or a personal computer (PC) can be used as a peer. A peer is classified as an edge peer or a super peer. A term "edge peer" means a terminal that individually generates and stores information among peers. An edge peer can share a resource with other edge peers by transmitting/receiving a resource to/from other edge peers. A term "super peer" means a terminal that manages edge peers. Super peers are connected to each other and are classified as management super peers or index super peers. A term "management super peer" means a terminal for which edge peers, of a number that is within a set range, are registered and which collects resource information of the registered edge peers. A term "index super peer" means a terminal that receives resource information corresponding to a previously set condition from a management super peer and manages resource information.

FIG. 1 is a schematic view illustrating a resource sharing system according to an exemplary embodiment.

Referring to FIG. 1, the resource sharing system includes a plurality of edge peers 110a, 110b, 110c, and 110d, and a plurality of super peers 120a, 120b, 120c, and 120d.

The first to fourth edge peers 110a, 110b, 110c, and 110d are individually registered and connected to the first to fourth super peers 120a, 120b, 120c, and 120d. In this case, each of the first to fourth edge peers 110a, 110b, 110c, and 110d can generate and store a resource.

The first to fourth super peers 120a, 120b, 120c, and 120d are connected to each other. In this case, each of the super peers 120a, 120b, 120c, and 120d can operate as at least one of a management super peer and an index super peer. The management super peer collects resource information, classifies the collected resource information and distributes the resource information to at least one index super peer. The index super peer stores and manages the resource information received from the management super peer.

Therefore, in the resource sharing system, the first to fourth super peers 120a, 120b, 120c, and 120d can distribute and manage the resource information. In the resource sharing system, the first to fourth edge peers 110a, 110b, 110c, and 110d can share the resources through the first to fourth super peers 120a, 120b, 120c, and 120d.

A resource sharing procedure according to the exemplary embodiment performed by the resource sharing system will be described with reference to FIGS. 2 to 4. In the exemplary embodiment, it is assumed that the first to third edge peers are registered to the first super peer, and the fourth edge peer is registered to the fourth super peer. It is also assumed that the first and fourth super peers operate as both management super peers and index super peers, and the second and third super peers operate as index super peers.

Figure 2:
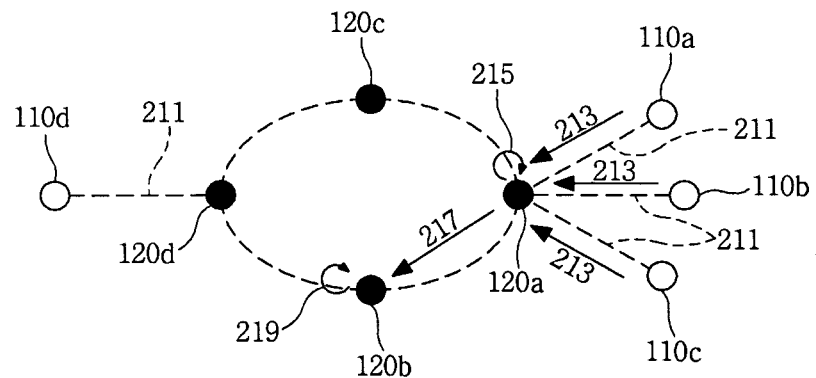
FIG. 2 is a flowchart illustrating a signal flow when a resource information processing procedure is performed according to an exemplary embodiment.

FIG. 2 is a flowchart illustrating a signal flow when a resource information processing procedure is performed. FIGS. 3a and 3b show examples of pseudocodes to describe the resource information processing procedure. Here, FIG. 3a shows a resource information classifying procedure, and FIG. 3b shows a resource information distributing procedure.

Referring to FIGS. 2, 3a and 3b, the edge peers 110a, 110b, 110c, and 110d are individually registered to the adjacent super peers 120a, 120b, 120c, and 120d in operation 211. Then, the first to third edge peers 110a, 110b and 110c transmit resource information to the first super peer 120a in operation 213. That is, the first super peer 120a collects the resource information from the first to third edge peers 110a, 110b and 110c.

Next, when the resource information is collected, the first super peer 120a classifies the resource information in operation 215. In this case, the first super peer 120a classifies the resource information according to a key word. The first super peer 120a distributes the resource information in operation 217. That is, the first super peer 120a may store at least a part of the resource information by itself or may distribute and transmit the resource information to at least one of the second to fourth super peers 120b, 120c and 120d. Then, when the resource information is received, at least one of the second to fourth super peers 120b, 120c and 120d stores the resource information in operation 219.

Figure 4A:
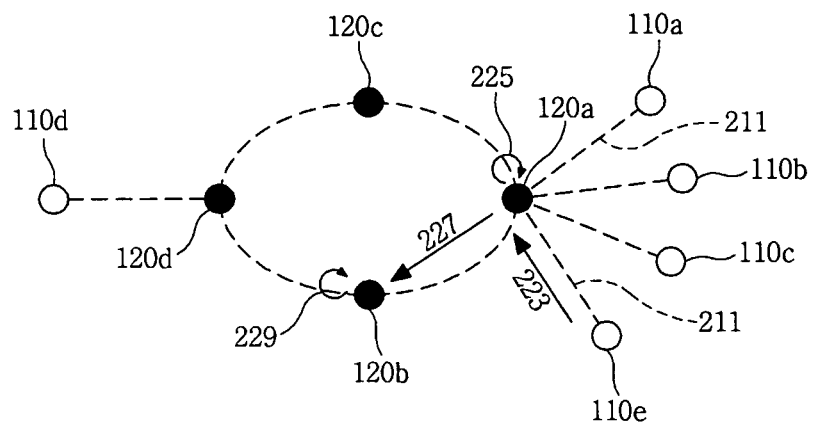
FIGS. 4a and 4b show signal flows when a resource information adding procedure is performed according to an exemplary embodiment.
Figure 4B:
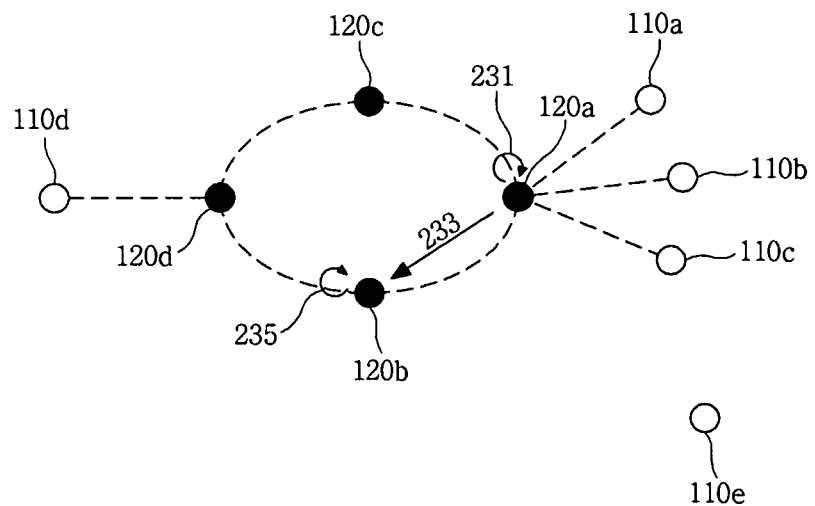

FIGS. 4a and 4b show a signal flow when a resource information updating procedure is performed. FIG. 4a shows a signal flow when a resource information adding procedure is performed, and FIG. 4b shows a signal flow when a resource information deleting procedure is performed. FIGS. 5a and 5b show examples of pseudocodes to describe the resource information updating procedure.

Referring to FIGS. 4a, 5a and 5b, a fifth edge peer 110e is registered to the first super peer 120a in operation 221. Then, the fifth edge peer 110e transmits resource information to the first super peer 120a in operation 223. Next, when the resource information is received, the first super peer 120a classifies the resource information in operation 225. In this case, the first super peer 120a classifies the resource information according to a key word. The first super peer 120a distributes the resource information in operation 227. That is, the first super peer 120a may store the resource information by itself or may transmit the resource information to at least one of the second to fourth super peers 120b, 120c and 120d. Then, when the resource information is received, at least one of the second to fourth super peers 120b, 120c and 120d additionally stores the resource information in operation 229.

Meanwhile, in the resource sharing system according to the exemplary embodiment, it has been described that the fifth edge peer 110e is newly registered to the first super peer 120a, but the exemplary embodiment is not limited thereto. That is, even if the fifth edge peer 110e does not register to the first super peer 120a, the first super peer 120a can update resource information. For example, when new resource information is received from at least one of the first to third edge peers 110a, 110b and 110c, the first super peer 120a can update the resource information.

Referring to FIGS. 4b and 5a, when deregistration of the fifth edge peer 110e is detected, the first super peer 120a analyzes the resource information previously received from the fifth edge peer 110e in operation 231. In this case, the first super peer 120a identifies at least one of the first to fourth super peers 120a, 120b, 120c, and 120d that stores the resource information of the fifth edge peer 110e. The first super peer 120a may delete the resource information of the fifth edge peer 110e or may transmit a deletion request message for deleting the resource information of the fifth edge peer 110e to the at least one of the second to fourth super peers 120b, 120c and 120d identified in operation 233. Upon receipt of the deletion request message, the at least one of the second to fourth super peers 120b, 120c and 120d deletes the resource information of the fifth edge peer 110e in operation 235.

Figure 6:
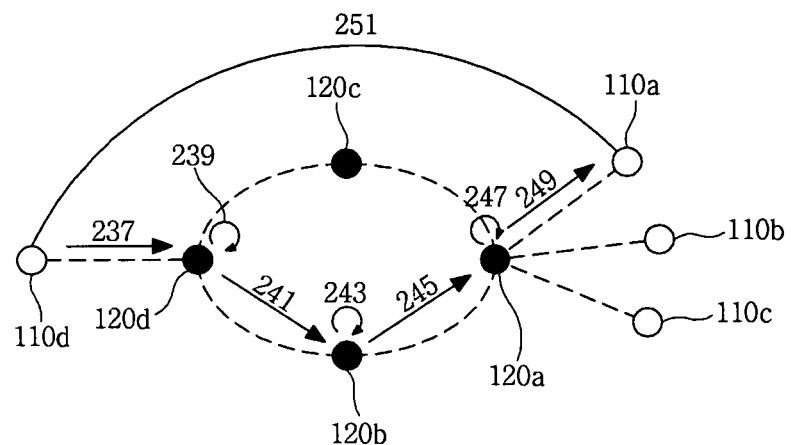
FIG. 6 shows a signal flow when a resource searching procedure is performed according to an exemplary embodiment.

FIG. 6 shows a signal flow when a resource searching procedure is performed.

Referring to FIG. 6, the fourth edge peer 110d transmits a resource request message to the fourth super peer 120d in operation 237. The resource request message may include a search word that is expected as a key word of a resource desired by the fourth edge peer 110d and an identification address of the fourth edge peer 110d. Upon receipt of the resource request message, the fourth super peer 120d identifies any one of the first to fourth super peers 120a, 120b, 120c, and 120d that stores the same key word as the search word in operation 239. If the second super peer 120b is determined as storing the same key word, the fourth super peer 120d transmits the resource request message to the second super peer 120b in operation 241. When the resource request message is received, the second super peer 120b identifies at least one of the first to third edge peers 110a, 110b and 110c that stores the same key word as the search word in operation 243. The second super peer 120b transmits the resource request message to the first super peer 120a that manages the at least one of the first to third edge peers 110a, 110b and 110c in operation 245.

Upon receipt of the resource request message, the first super peer 120a identifies at least one of the first to third edge peers 110a, 110b and 110c that stores the resource information of the same key word as the search word in operation 247. The first super peer 120a transmits the resource request message to the at least one of the first to third edge peers 110a, 110b and 110c identified in operation 249. Upon receipt of the resource request message, the at least one of the first to third edge peers 110a, 110b and 110c transmits a resource having a resource name of the same key word as the search word to the fourth edge peer 110d in operation 251.

Meanwhile, in the exemplary embodiment, it has been described that the first and fourth super peers 120a and 120d operate as management super peers and index super peers, and the second and third super peers 120b and 120c operate as index super peers, but the exemplary embodiment is not limited thereto. For example, it can be implemented such that the first and fourth super peers 120a and 120d operate as management super peers, and the second and third super peers 120b and 120c operate as index super peers. The embodiment can also be implemented such that the first to fourth super peers 120a, 120b, 120c, and 120d operate as management super peers and index super peers.

Figure 7:
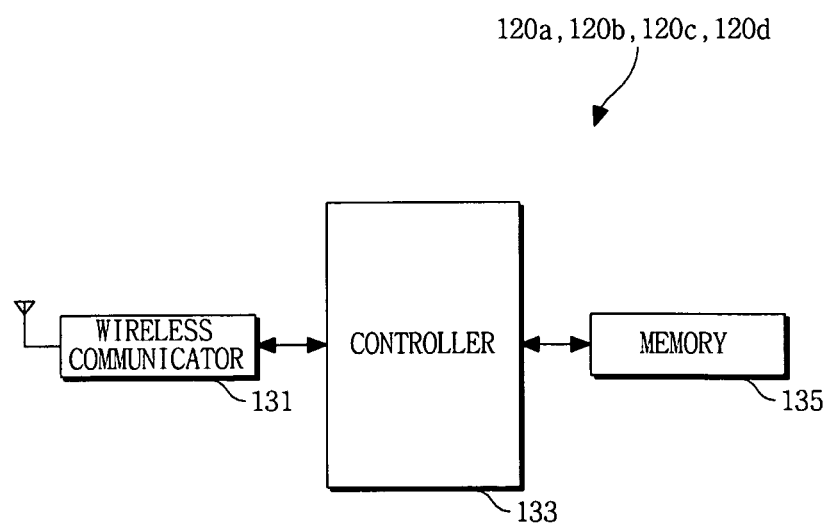
FIG. 7 is a block diagram illustrating a configuration of a super peer in the resource sharing system according to an exemplary embodiment.

FIG. 7 is a block diagram illustrating the super peer in the resource sharing system according to the exemplary embodiment.

Referring to FIG. 7, each of the super peers 120a, 120b, 120c, and 120d includes a wireless communicator 131, a controller 133, and a memory 135.

The wireless communicator 131 performs a wireless communication function of the super peer 120a, 120b, 120c, or 120d. The wireless communicator 131 includes a radio frequency (RF) transmitter that up-converts and amplifies a frequency of a transmitted signal, and an RF receiver that reduces noise of a received signal and down-converts a frequency.

The controller 133 performs a function for controlling an overall operation of the super peer 120a, 120b, 120c, or 120d.

The controller 133 includes a data processing unit that includes a transmitter for encoding and modulating a transmitted signal and a receiver for demodulating and decoding a received signal. The data processing unit may include a modem and a codec.

The controller 133 collects resource information from registered edge peers when it is selected as a management super peer according to the exemplary embodiment. The controller 133 processes the resource information according to a key word according to the exemplary embodiment. In this case, the controller 133 classifies and distributes the resource information according to a key word. The controller 133 performs a control operation for updating the resource information according to a key word when the resource information is changed according to the exemplary embodiment. In addition, the controller 133 searches for a resource when receiving or detecting a resource request message according to the exemplary embodiment. In this case, the controller 133 searches for a resource using a search word of a resource request message.

Meanwhile, when resource information according to a key word is received, the controller 133 performs a control operation for storing the resource information according to the exemplary embodiment. Also, when the resource information according to a key word is changed, the controller 133 performs a control operation for updating the resource information according to the exemplary embodiment. Also, when a resource request message is received, the controller 133 searches for resource information containing the same key word as a search word of the resource request message according to the exemplary embodiment. The controller 133 instructs an edge peer that stores corresponding resource information to transmit a resource according to the exemplary embodiment. In this case, the controller 133 transfers the resource request message to the edge peer that stores corresponding resource information.

The memory 135 includes a program memory and a data memory. The program memory stores an operation program of the super peer 120a, 120b, 120c, or 120d and a program for sharing a resource according to the exemplary embodiment. The data memory stores data generated during an operation of a program. The memory 135 can store information of the edge peers 110a, 110b, 110c, and 110d that are registered to the corresponding super peer 120a, 120b, 120c, or 120d and resource information for each of the edge peers 110a, 110b, 110c, and 110d according to the exemplary embodiment. The memory 135 stores information of other super peers 120a, 120b, 120c, and 120d according to the exemplary embodiment. In this case, the memory 135 stores the information with a condition allocated for each of the super peers 120a, 120b, 120c, and 120d so that each of the super peers 120a, 120b, 120c, and 120d can manage resource information corresponding to a certain condition. The memory 135 stores resource information classified according to a key word according to the exemplary embodiment.

Figure 8:
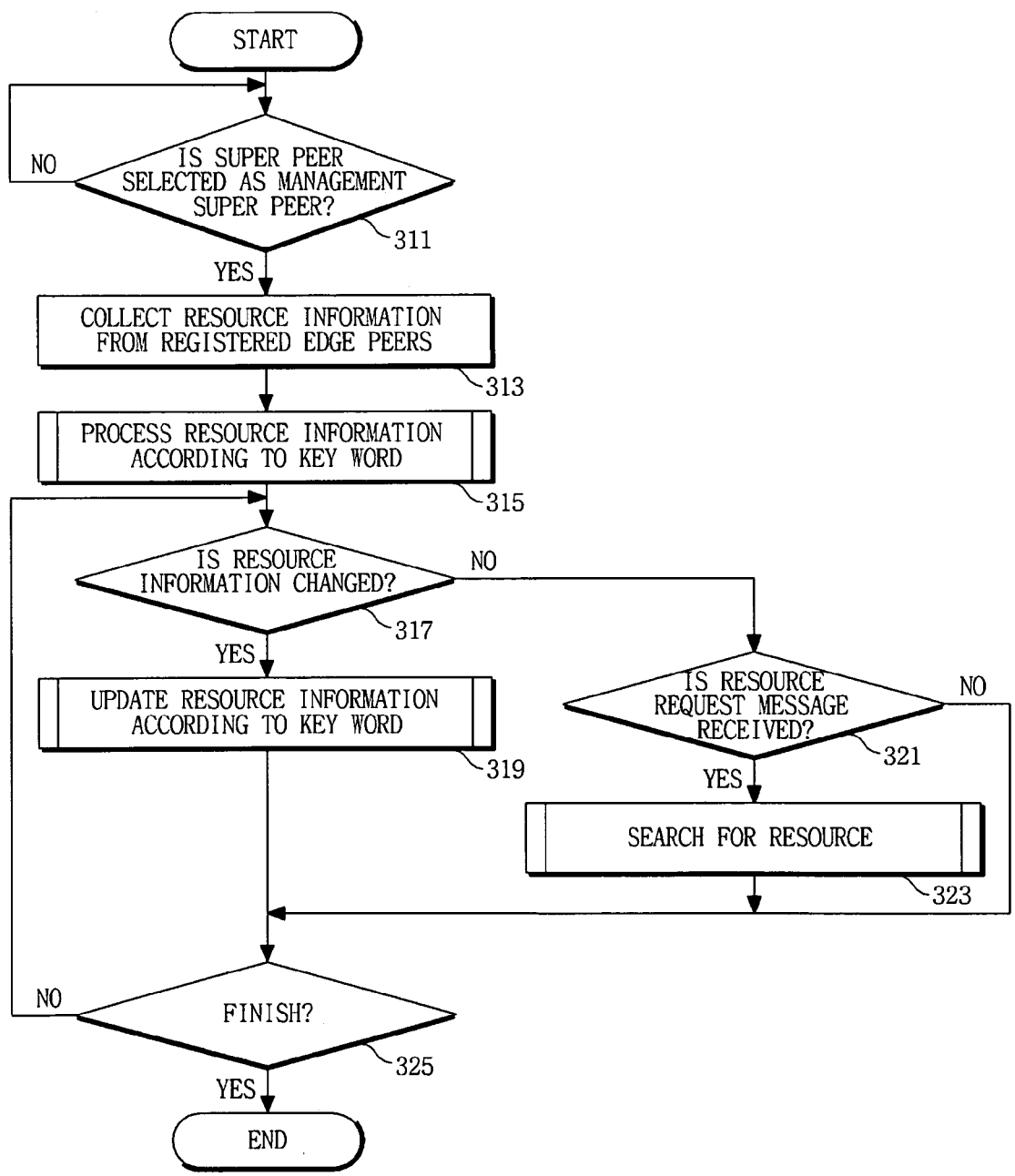
FIG. 8 is a flowchart illustrating a resource sharing procedure of a management super peer.

A resource sharing procedure performed when a super peer operates as a management super peer will be described with reference to FIG. 8. FIG. 8 is a flowchart illustrating a resource sharing procedure of a management super peer.

Referring to FIG. 8, when a super peer 120a, 120b, 120c, or 120d is selected as a management super peer in operation 311, the controller 133 collects resource information from the edge peers 110a, 110b, 110c, and 110d registered to the corresponding super peer 120a, 120b, 120c, or 120d in operation 313. That is, when a resource is generated, the edge peers 110a, 110b, 110c, and 110d store the generated resource and transmit resource information of the stored resource. Then, when resource information is received, the controller 133 stores the received resource information. The controller 133 then processes the resource information according to a key word in operation 315.

Figure 9:
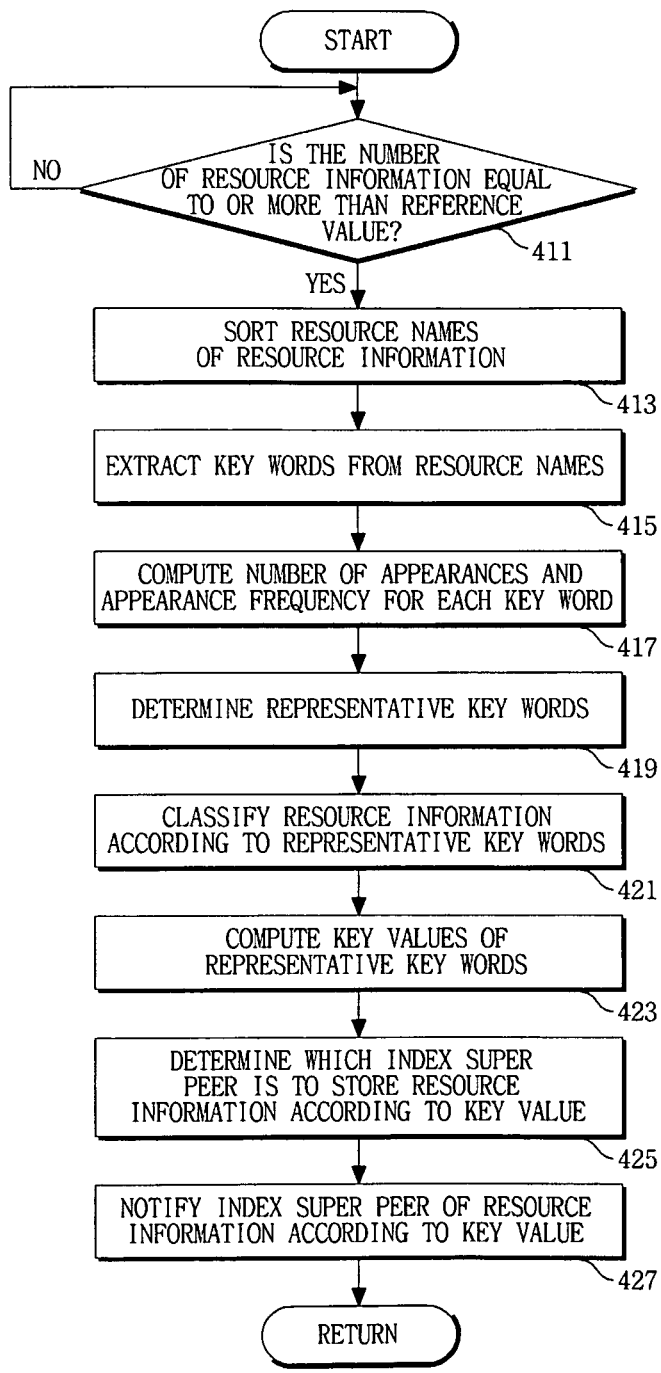
FIG. 9 is a flowchart illustrating a procedure for processing resource information according to a key word in FIG. 8.

A procedure in which the controller 133 processes resource information according to a key word will be described in detail with reference to FIG. 9. FIG. 9 is a flowchart illustrating a procedure for processing resource information according to a key word in FIG. 8.

Referring to FIG. 9, if the number of collected resource information is equal to a previously set reference value or greater in operation 411, the controller 133 sorts resource names of resource information in operation 413. In this case, the controller 133 can sort the resource names in a table form as shown in the below Table 1.

TABLE 1

| Resource name |
| --- |
| I have a red car |
| Live like a red flower |
| She is fond of the white car |

Next, the controller 133 extracts key words from the resource names in operation 415. That is, the controller 133 can extract the key words by excluding stop words from the resource names. In this case, the memory 135 can store the stop words in a table form as shown in below Table 2 in advance under control of the controller 133. The controller 133 can extract the key words as shown in the below Table 3.

TABLE 2

| Stop word |
| --- |
| I |
| Be |
| She |
| A |
| Is |
| Of |
| The |
| , |
| — |
| — |

TABLE 3

| Key word |
| --- |
| have red car |
| Live like red flower |
| fond white car |

Subsequently, the controller 133 computes the number of appearances and the appearance frequency for each key word in operation 417. That is, the controller 133 computes the number of appearances for each key word in the resource names. The controller 133 computes the appearance frequency for each key word using the number of appearances according to the below Equation 1.

$$p(k) = \frac{O(k)}{\sum_{k=1}^{n}} \qquad \text{Equation 1}$$

Here, O(k) denotes the computed number of appearances, and p(k) denotes the computed appearance frequency. In this case, the controller 133 can sort the number of appearances and the appearance frequency for each key word in a key word management table form as shown in the below Table 4. For example, if the total number of appearances of key words is 10 and the number of appearances of "red" is 2, the appearance frequency of "red" is 0.2. Also, if the total number of appearances of key words is 10 and the number of appearances of "white" is 1, the appearance frequency of "white" is 0.1.

TABLE 4

| Key word | Number of appearances | Appearance frequency |
|---|---|---|
| red | 2 | 0.2 |
| car | 2 | 0.2 |
| white | 1 | 0.1 |
| — | — | — |
| — | — | — |
| — | — | — |
| Total | 10 | 1 |

Subsequently, the controller 133 determines representative key words in operation 419. In this case, the controller 133 determines at least one of the key words to be the representative key word using the computed appearance frequency. That is, if the appearance frequency of a certain key word exceeds a previously set reference value, the controller 133 may determine the corresponding key word to be the representative key word. For example, if a reference value is 0.12, "red" can be determined as a representative key word, but "white" cannot be determined as a representative key word. Then, the controller 133 classifies resource information according to the representative key words in operation 421. In this case, the controller 133 may sort resource information classified according to the representative key words in a key word matching table form as shown in the below Table 5.

TABLE 5

| Representative key word | Resource name | Identification address |
|---|---|---|
| red | I have a red car | Peer0001 |
| | Live like a red flower | Peer0002 |
| car | I have a red car | Peer0001 |
| | She is fond of the white car | Peer0003 |

Finally, the controller 133 computes key values of the representative key words in operation 423. In this case, the controller 133 computes the key value of each representative key word by processing the representative key word using a hash function. The controller 133 determines an index super peer to store resource information according to the key value in operation 425. In this case, the memory 135 stores information of other super peers, particularly a range of a key value allocated for each index super peer. That is, the controller 133 determines an index super peer corresponding to the computed key value. Thereafter, the controller 133 notifies an index super peer of resource information for each key value in operation 427 and then returns to FIG. 8. That is, the controller 133 transmits the resource information of the representative key word corresponding to the computed key value to the index super peer. For example, the controller 133 can transmit at least one of resource information classified as "red" and resource information classified as "car" to an index super peer. The controller 133 can transmit resource information classified as "red" and resource information classified as "car" to a single index super peer or index super peers different from each other, respectively.

Next, when previously collected resource information is changed in operation 317, the controller 133 updates resource information classified according to a key word in operation 319. In this case, the controller 133 can add certain resource information to the resource information classified according to a key word or delete certain resource information from the resource information classified according to the key word.

Figure 10:
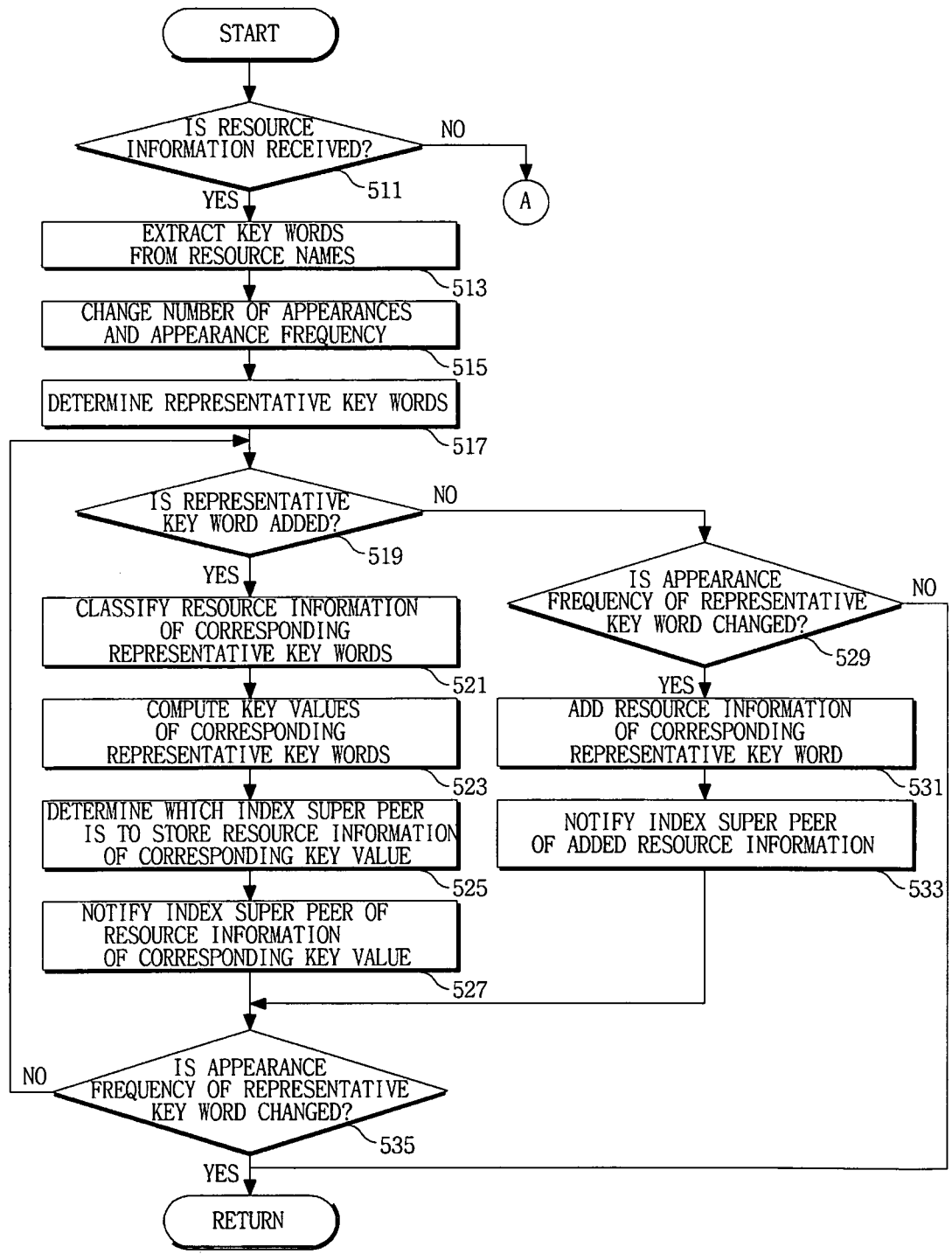
FIG. 10 shows a procedure for adding resource information according to a key word in FIG. 8.
Figure 11:
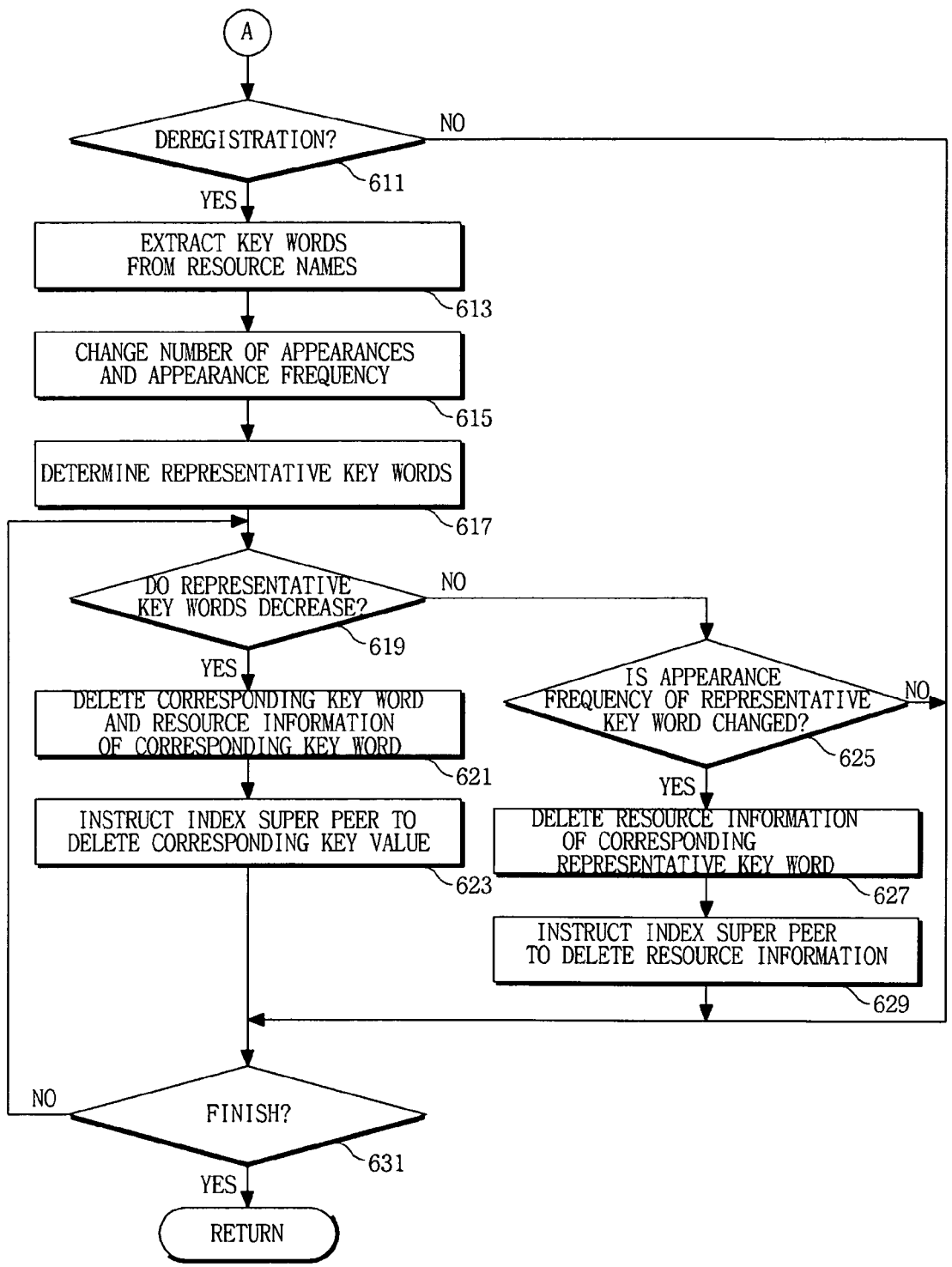
FIG. 11 shows a procedure for deleting resource information according to a key word in FIG. 8.

A procedure in which the controller 133 updates resource information classified according to a key word will be described in detail with reference to FIGS. 10 and 11. FIGS. 10 and 11 are flowcharts illustrating a procedure for updating resource information classified according to a key word in FIG. 8. Particularly, FIG. 10 shows a procedure for adding resource information according to a key word, and FIG. 11 shows a procedure for deleting resource information according to a key word.

Referring to FIG. 10, when resource information is changed, the controller 133 confirms whether resource information is received in operation 511. In this case, if it is confirmed that resource information is received, the controller 133 extracts key words from a resource name contained in the resource information in operation 513. That is, the controller 133 can extract the key words by excluding stop words of Table 2 from the resource name. For example, if a resource name is "White Heat, Red Hot", the controller 133 can extract "White Heat Red Hot" as key words.

Next, the controller 133 computes the number of appearances and the appearance frequency for each key word in operation 515. In this case, the controller 133 can change the key word management table as shown in the below Table 6. That is, the controller 133 can change the number of appearances and the appearance frequency of a certain key word in the key word management table and can add a key word.

TABLE 6

| Key word | Number of appearances | Appearance frequency |
|---|---|---|
| red | 3 | 0.21 |
| car | 2 | 0.14 |
| white | 2 | 0.14 |
| — | — | — |
| — | — | — |
| — | — | — |
| Total | 14 | 1 |

Next, the controller 133 determines representative key words in operation 517. In this case, the controller 133 determines at least one of the key words as a representative key word using the computed appearance frequency. That is, if the appearance frequency of a certain key word exceeds a previously set reference value, the controller 133 can determine the corresponding key word as a representative key word. For example, if the reference value is 0.12, "white" can be determined as a representative key word.

Subsequently, the controller 133 determines whether a representative key word is added in operation 519. That is, the controller 133 determines whether a representative key word exists in the key word matching table. In this case, if the representative key word is determined to exist in the key word matching table, the controller 133 determines that the determined representative key word is added. For example, the controller 133 determines that "White" is added. That is, if it is determined that a representative key word is added, the controller 133 classifies resource information of the corresponding representative key word in operation 521. In this case, the controller 133 can change the key word matching table by adding resource information classified as an added representative key word as shown in the below Table 7.

TABLE 7

| Representative key word | Resource name | Identification address |
|---|---|---|
| red | I have a red car | Peer0001 |
|  | Live like a red flower | Peer0002 |
| car | I have a red car | Peer0001 |
|  | She is fond of the white car | Peer0003 |
| white | She is fond of the white car | Peer0003 |
|  | White Heat, Red Hot | Peer0005 |

Subsequently, the controller 133 computes a key value of the corresponding representative key word in operation 523. In this case, the controller 133 computes the key value of the corresponding representative key word by processing the corresponding representative key word using a hash function. The controller 133 determines an index super peer to store resource information of the computed key value in operation 525. That is, the controller 133 determines the index super peer corresponding to the computed key value. Thereafter, the controller 133 notifies the index super peer of resource information of the computed key value in operation 527. That is, the controller 133 transmits resource information of the representative key word corresponding to the computed key value to the index super peer. For example, the controller 133 can further transmit resource information classified as "White" to an index super peer that stores at least one of resource information classified as "red" and resource information classified as "car". Also, the controller 133 can transmit resource information classified as "White" to an index super peer that does not store resource information classified as "red" or resource information classified as "car".

Meanwhile, if it is determined in operation 519 that the representative key word is not added, the controller 133 determines whether the appearance frequency of the representative key word is changed in operation 529. That is, the controller 133 determines whether the appearance frequency of the representative key word that is previously determined increases. If it is determined that the appearance frequency of the representative key word is changed, the controller 133 adds resource information of the representative key word in operation 531. In this case, the controller 133 can change the key word matching table by adding resource information received as a representative key word as shown in the below Table 8. Then, the controller 133 notifies an index super peer corresponding to a key value of the corresponding representative key word of added resource information in operation 533. For example, the controller 133 further transmits resource information having a resource name of "White Heat, Red Hot" to an index super peer that stores resource information classified as "red".

TABLE 8

| Representative key word | Resource name | Identification address |
|---|---|---|
| red | I have a red car | Peer0001 |
|  | Live like a red flower | Peer0002 |
|  | White Heat, Red Hot | Peer0005 |

TABLE 8-continued

| Representative key word | Resource name | Identification address |
|---|---|---|
| car | I have a red car | Peer0001 |
|  | She is fond of the white car | Peer0003 |
| white | She is fond of the white car | Peer0003 |
|  | White Heat, Red Hot | Peer0005 |

Finally, the controller 133 determines whether to finish the procedure for updating resource information classified according to a key word in operation 535. In this case, if it is determined that the procedure has to be finished, the controller 133 finishes the procedure for updating resource information classified according to a key word and then returns to FIG. 8. If it is determined that the procedure does not have to be finished, the controller 133 repetitively performs operations 519 to 535.

Meanwhile, referring to FIG. 11, if it is determined in operation 511 that the receipt of resource information is not detected, the controller 133 confirms whether the edge peer is deregistered in operation 611. That is, if it is confirmed that at least one of edge peers registered to a corresponding super peer is deregistered, the controller 133 extracts key words from a resource name of resource information collected from a corresponding edge peer in operation 613. For example, the controller 133 can extract key words by excluding stop word of Table 2 from a resource name. For example, if a resource name is "White Heat, Red Hot", the controller 133 can extract "White Heat Red Hot" as key words.

Next, the controller 133 computes the number of appearances and the appearance frequency for each key word in operation 615. That is, the controller 133 computes the number of appearances and the appearance frequency for each key word by deleting an extracted key word. In this case, the controller 133 can change the key word management table using the extracted key word as shown in the below Table 9. That is, in the key word management table, the controller 133 can change the number of appearances and the appearance frequency for a certain key word and can delete a key word.

TABLE 9

| Key word | Number of appearances | Appearance frequency |
|---|---|---|
| red | 2 | 0.2 |
| car | 2 | 0.2 |
| white | 1 | 0.1 |
| — | — | — |
| — | — | — |
| Total | 10 | 1 |

Subsequently, the controller 133 determines a representative key word in operation 617. In this case, the controller 133 determines at least one of the key words as a representative key word using the computed appearance frequency. For example, if the appearance frequency of a certain key word exceeds a previously set reference value, the controller 133 can determine the corresponding key word as a representative key word. For example, if a reference value is 0.12, "red" can be determined as a representative key word, but "white" cannot be determined as a representative key word.

Subsequently, the controller 133 determines whether representative key words decrease in operation 619. That is, the controller 133 determines whether a deleted representative key word exists by excluding a determined representative key word from the key word matching table. If it is determined that representative key words decrease, the controller 133 deletes the corresponding representative key word and resource information of the corresponding representative key word in operation 621. In this case, the controller 133 may change the key word matching table by deleting the corresponding representative key word and resource information of the corresponding representative key word as shown in the below Table 10. Also, the controller 133 instructs an index super peer corresponding to the key value of the corresponding representative key word to delete the corresponding key value and resource information of the corresponding key value in operation 623. That is, the controller 133 transmits a deletion request message for deleting the corresponding key value and resource information of the corresponding key value. For example, the controller 133 instructs an index super peer that stores resource information classified as "white" to delete resource information classified as "white".

TABLE 10

| Representative key word | Resource name | Identification address |
| --- | --- | --- |
| red | I have a red car | Peer0001 |
|  | Live like a red flower | Peer0002 |
|  | White Heat, Red Hot | Peer0005 |
| car | I have a red car | Peer0001 |
|  | She is fond of the white car | Peer0003 |

Meanwhile, if it is determined in operation 619 that representative key words do not decrease, the controller 133 determines whether the appearance frequency of a representative key word is changed in operation 625. That is, the controller 133 determines whether the appearance frequency of a previously determined representative key word decreases. If it is determined that the appearance frequency of the representative key word is changed, the controller 133 deletes resource information of the corresponding representative key word in operation 627. In this case, the controller 133 can change the key word matching table by deleting resource information of the corresponding representative key word as shown in the below Table 11. Then, the controller 133 instructs an index super peer corresponding to the key value of the corresponding representative key word to delete resource information of a deregistered edge peer in operation 629. That is, the controller 133 transmits a deletion request message for deleting resource information of the deregistered edge peer. For example, the controller 133 instructs an index super peer that stores resource information classified as "red" to delete resource information having a resource name of "White Heat, Red Hot".

TABLE 11

| Representative key word | Resource name | Identification address |
| --- | --- | --- |
| red | I have a red car | Peer0001 |
|  | Live like a red flower | Peer0002 |
| car | I have a red car | Peer0001 |
|  | She is fond of the white car | Peer0003 |

Finally, the controller 133 determines whether to finish the procedure for updating resource information classified according to a key word in operation 631. In this case, if it is determined that the procedure has to be finished, the controller 133 finishes the procedure for updating resource information classified according to a key word and then returns to FIG. 8. If it is determined that the procedure does not have to be finished, the controller 133 repetitively performs operations 619 to 631.

Meanwhile, if a change in resource information is not detected in operation 317 and the resource request message is received in operation 321, the controller 133 searches for a resource in operation 323. In this case, the controller 133 searches for the resource using a search word of the resource request message.

Figure 12:
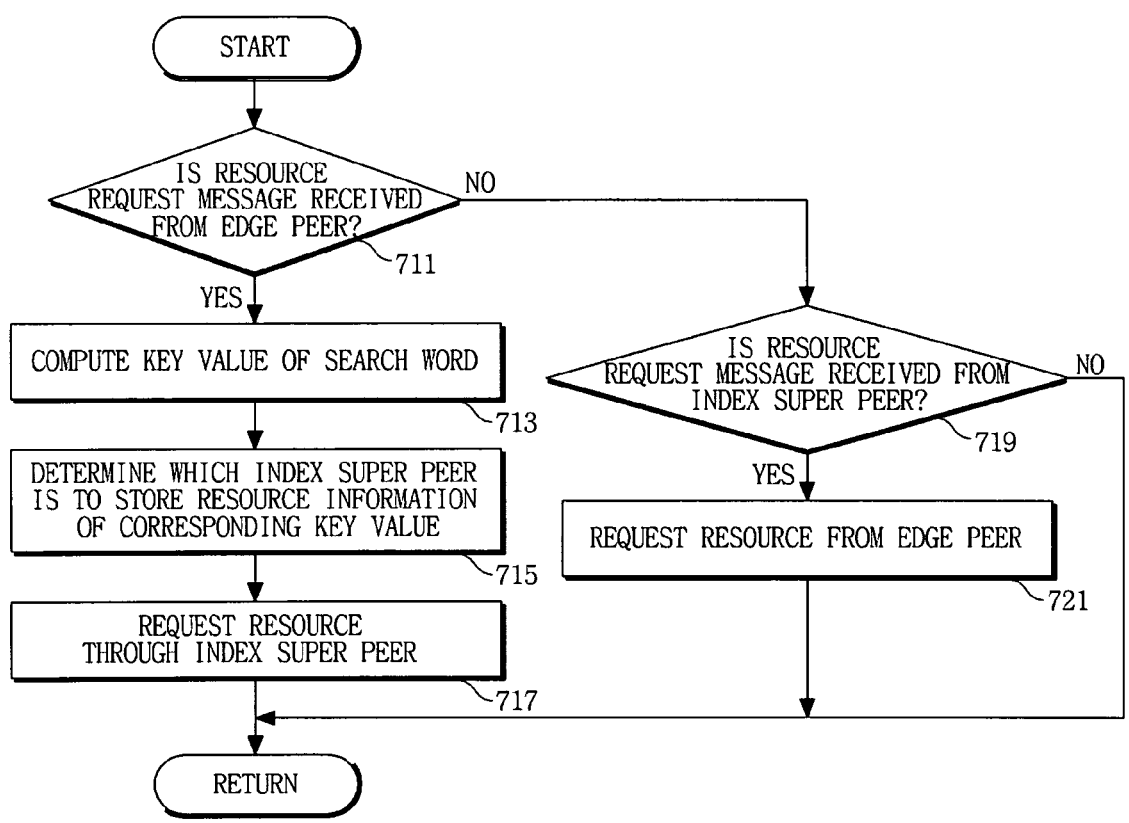
FIG. 12 is a flowchart illustrating a procedure for searching for a resource in FIG. 8.

A procedure in which the controller 133 searches for a resource will be described in detail with reference to FIG. 12. FIG. 12 is a flowchart illustrating a procedure for searching for a resource in FIG. 8.

Referring to FIG. 12, the controller 133 determines whether the resource request message is received from at least one of the edge peers that are registered to a corresponding super peer in operation 711. In this case, if it is determined that the resource request message is received from the at least one of the edge peers, the controller 133 computes a key value of a search word of the resource request message in operation 713. In this case, the controller 133 computes the key value of the search word by processing a search word using a hash function. The controller 133 determines an index super peer that stores resource information of the computed key value in operation 715. That is, the controller 133 determines an index super peer to that a range including the computed key value is allocated. The controller 133 requests a resource through the determined index super peer in operation 717 and then returns to FIG. 6. That is, the controller 133 may transmit the resource request message to the determined index super peer.

Meanwhile, if it is determined in operation 711 that the resource request message is not received from the at least one of the edge peers, the controller 133 determines whether the resource request message is received from an index super peer in operation 719. In this case, if it is determined that the resource request message is received from the index super peer, the controller 133 requests a resource to at least one of the edge peers that are registered to a corresponding super peer using resource information including the same key word as a search word of the resource request message in operation 721 and then returns to FIG. 8. That is, the controller 133 can transmit the resource request message to the at least one of the edge peers that are registered to the corresponding super peer.

Next, the controller 133 determines whether to finish the resource sharing procedure in operation 325. In this case, if it is determined that the procedure has to be finished, the controller 133 finishes the resource sharing procedure. However, if it is determined that the procedure does not have to be finished, the controller 133 repetitively performs operations 317 to 325.

Figure 13:
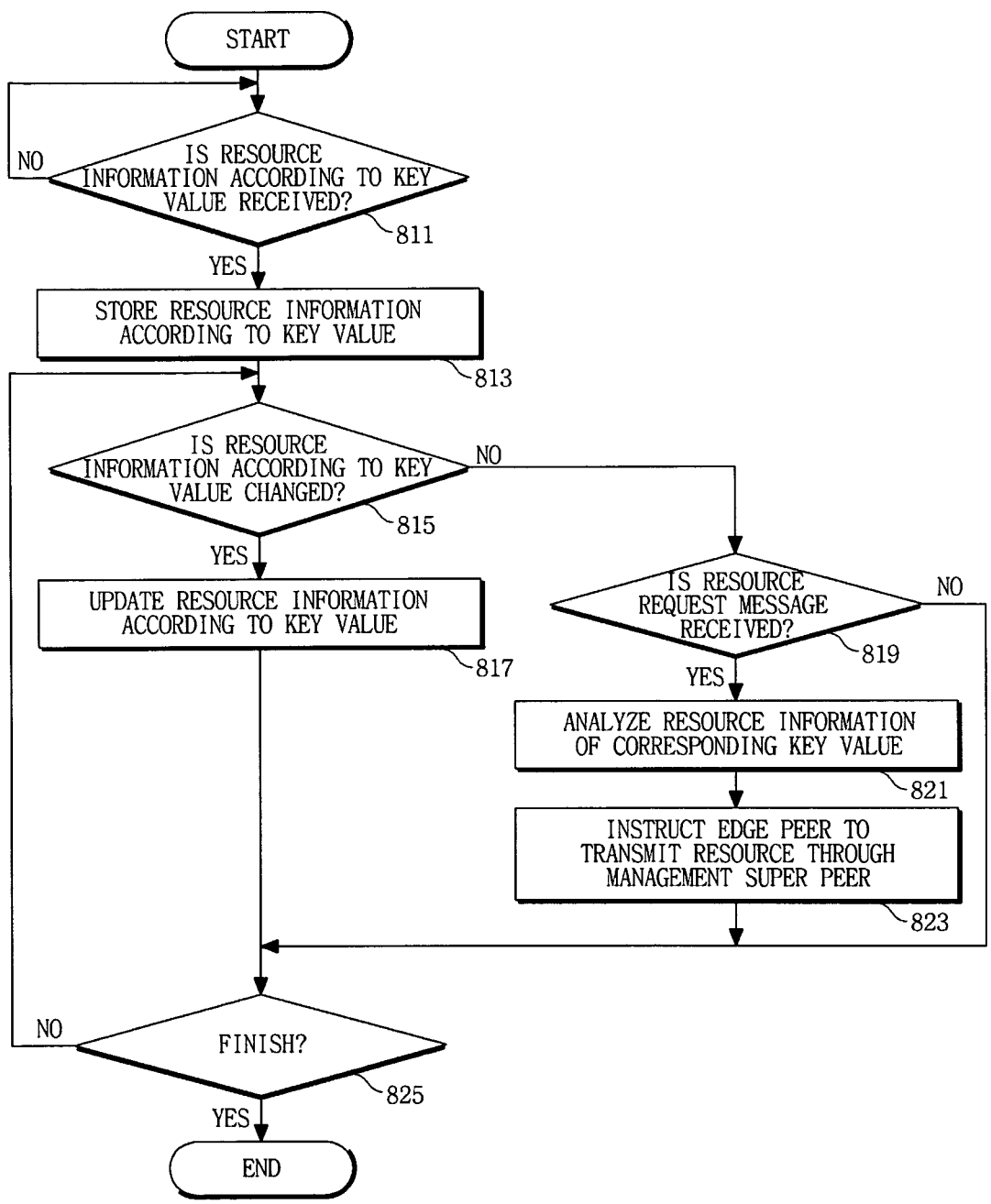
FIG. 13 is a flowchart illustrating a resource sharing procedure of an index super peer.

Meanwhile, a resource sharing procedure performed when a super peer operates as an index super peer will be described with reference to FIG. 13. FIG. 13 is a flowchart illustrating a resource sharing procedure of an index super peer.

Referring to FIG. 13, when resource information classified according to a key value is received in operation 811, the controller 133 stores the resource information classified according to the key value in operation 813.

Then, when resource information classified according to a key value is changed in operation 815, the controller 133 updates the resource information classified according to the key value in operation 817. In this case, the controller 133 may add or delete resource information of a key value that is previously stored or may add or delete a certain key value and resource information of the key value.

Meanwhile, if a change in resource information classified according to a key value is not detected in operation 815 and the resource request message is received in operation 819, the controller 133 analyzes the resource information of the corresponding key value in operation 821. In this case, the controller 133 determines a management super peer that manages an edge peer storing the resource information of the corresponding key value. The controller 133 instructs the management super peer to transmit a resource in operation 823. That is, the controller 133 may transmit the resource request message to the management super peer.

Finally, the controller 133 determines whether to finish the resource sharing procedure in operation 825. In this case, if it is determined that the procedure has to be finished, the controller 133 finishes the resource sharing procedure. However, if it is determined that the procedure does not have to be finished, the controller 133 repetitively performs operations 815 to 825.

Meanwhile, in the exemplary embodiment described above, it has been described that if the appearance frequency of a key word exceeds the previously set reference value, the corresponding key word is determined to be the representative key word in the resource sharing system, but the exemplary embodiment is not limited thereto. For example, the resource sharing system can be implemented such that if the number of appearances of a key word exceeds the previously set reference value, a corresponding key word is determined as a representative key word.

In the resource sharing system according to the exemplary embodiment, the super peers distribute and manage resource information of the edge peers according to a key word. Therefore, if a resource is requested using part of a name of a resource desired by a certain edge peer, the super peer searches for resources including the resource desired by the edge peer. Therefore, a user of an edge peer can easily acquire a desired resource even using part of a name of a desired resource.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A resource sharing method, the method comprising:
providing a plurality of edge peers that individually store a resource, a management super peer, and a plurality of index super peers, each index super peer receiving resource information corresponding to a previously set condition from the management super peer,
registering, by the management super peer, a predetermined number of the edge peers;
collecting, by the management super peer, resource information of the registered edge peers corresponding to a certain resource;
classifying, by the management super peer, at least one resource name of the collected resource information such that a representative key word corresponds to the at least one resource name, when the resource information is collected, wherein the representative key word is selected from among at least one key word comprising a part of the at least one resource name;
determining which of the plural index super peers is to store the classified resource information, based on a key value range, associated with the previously set condition, allocated for each index super peer;
distributing, by the management super peer, the classified resource information according to the representative key word to the determined index super peer; and
storing, by the determined index super peer, the distributed classified resource information when the distributed classified resource information is received by the determined index super peer,
wherein the classifying of the collected resource information by the management super peer comprises:
extracting key words from the collected resource information;
computing a number of appearances of the key words extracted from the collected resource information;
determining the representative key word among the extracted key words using the computed number of appearances; and
classifying the collected resource information according to the determined representative key word,
wherein the determining of the representative key word comprises:
determining the extracted key word to be the representative key word when the computed number of appearances exceeds a previously set reference value.

2. The resource sharing method of claim 1, wherein a different key word is allocated to each of the plural index super peers, and the distributing of the classified resource information comprises:
identifying, by the management super peer, a corresponding key word allocated to a respective index super peer, of the plurality of index super peers; and
distributing and transmitting, by the management super peer, respective resource information according to the corresponding key word, wherein plural resource information are each classified according to respective corresponding key words.

3. The resource sharing method of claim 1, wherein the determining of the representative key word comprises:
computing an appearance frequency for the extracted key words, using a number of the collected resource information and the computed number of appearances, according to:

$$p(k) = \frac{O(k)}{\sum_{k=1}^{n}},$$

where O(k) denotes the computed number of appearances, and p(k) denotes the computed appearance frequency.

4. A resource sharing method, the method comprising:
providing a plurality of edge peers that individually store a resource, a management super peer that manages the plurality of edge peers, and a plurality of index super peers that index resource information, received from the management super peer and corresponding to a previously set condition, including a resource name that includes at least one key word,
wherein each index super peer is allocated a key value range, corresponding to the previously set condition that is used to determine whether to store the resource information,
wherein the resource name of the resource information is classified such that a representative key word corresponds to the resource name, and the representative key word is selected from among the at least one key word included in the resource name;
transmitting, by the management super peer that manages a first edge peer, a resource request message to an index super peer among the plurality of index super peers that manages resource information, when the resource request message is received from the first edge peer by the management super peer, wherein the index super peer among the plurality of index super peers is selectively transmitted the resource request message by the management super peer based upon an analysis of a search word included in the resource request and the representative key word;

transmitting, by the index super peer, the resource request message to at least one second edge peer that stores a resource of the resource information stored by the index super peer when the resource request message is received by the index super peer; and transmitting, by the second edge peer, the resource to the first edge peer when the resource request message is received by the second edge peer, wherein the method further comprises:

classifying of the collected resource information by the management super peer comprises:

extracting key words from the collected resource information;

computing a number of appearances of the key words extracted from the collected resource information;

determining the representative key word among the extracted key words using the computed number of appearances; and classifying the collected resource information according to the determined representative key word, wherein the determining of the representative key word comprises:

determining the extracted key word to be the representative key word when the computed number of appearances exceeds a previously set reference value.

5. The resource sharing method of claim 4, wherein the transmitting of the resource request message to at least one second edge peer comprises:

transmitting, by the index super peer, the resource request message to a second management super peer that manages the second edge peer; and transmitting, by the second management super peer, the resource request message to the second edge peer when the resource request message is received by the second management super peer.

6. A resource sharing method, the method comprising:

providing a plurality of edge peers that individually store a resource, a management super peer that manages the plurality of edge peers, and a plurality of index super peers that index resource information, received from the management super peer and corresponding to a previously set condition, including a resource name that includes at least one key word, wherein each index super peer is allocated a key value range, corresponding to the previously set condition, that is used to determine whether to store the resource information, wherein the resource name of the resource information is classified such that a representative key word corresponds to the resource name, and the representative key word is selected from among the at least one key word included in the resource name;

transmitting, by the management super peer, a resource request message including a search word to one or more second edge peers that store a resource, with the resource being respectively identified for each of the one or more second edge peers by respective resource information including a key word, with the transmitting of the resource request message to the one or more second edge peers being based on an analysis of the search word and the representative key word, when a resource request message is received from a first edge peer by the super peer; and transmitting, by at least one of the one or more second edge peers, the resource to the first edge peer when the resource request message is received by the at least one of the one or more second edge peers, wherein the method further comprises:

classifying of the collected resource information by the management super peer comprises:

extracting key words from the collected resource information;

computing a number of appearances of the key words extracted from the collected resource information;

determining the representative key word among the extracted key words using the computed number of appearances; and classifying the collected resource information according to the determined representative key word, wherein the determining of the representative key word comprises:

determining the extracted key word to be the representative key word when the computed number of appearances exceeds a previously set reference value.

7. A resource sharing method, the method comprising:

a plurality of edge peers that individually store a resource, a management super peer that manages the plurality of edge peers, and a plurality of index super peers that manage the index resource information, received from the management super peer and corresponding to a previously set condition, including a name of the resource that includes at least one key word, wherein each index super peer is allocated a key value range, corresponding to the previously set condition, that is used to determine whether to store the resource information, wherein the name of the resource of the resource information is classified such that a representative key word corresponds to the resource, and the representative key word is selected from among the at least one key word included in the name of the resource;

distributing and storing, by a second management super peer and the plurality of index super peers, respective resource information for a resource stored by each of one or more second edge peers, according to the representative key word included in each respective resource information, when the respective resource information for the resource stored by each of the one or more second edge peers is collected;

transmitting a resource request message, when the resource request message including a search word is received from a first edge peer by the management super peer, by the management super peer to at least one of the one or more second edge peers, based on a comparison of the search word and the representative key word; and transmitting, by the at least one of the one or more second edge peers, the resource to the first edge peer when the resource request message is received by the at least one of the one or more second edge peers, wherein the method further comprises:

classifying of the collected resource information by the management super peer comprises:

extracting key words from the collected resource information;

computing a number of appearances of the key words extracted from the collected resource information;

determining the representative key word among the extracted key words using the computed number of appearances; and classifying the collected resource information according to the determined representative key word, wherein the determining of the representative key word comprises:

determining the extracted key word to be the representative key word when the computed number of appearances exceeds a previously set reference value.

8. The resource sharing method of claim 7, wherein the transmitting of the resource request message comprises:

transmitting, by the management super peer that manages the first edge peer, the resource request message to at least one index super peer that manages the resource information including the representative key word; and transmitting, by the at least one index super peer, the resource request message to the at least one second edge peer that stores the resource corresponding to the resource information when the resource request message is received by the at least one index super peer.

9. The resource sharing method of claim 8, wherein different key words are allocated to each of plural index super peers, including the at least one index super peer, and the distributing and storing of the respective resource information comprises:

classifying, by the management super peer, the collected resource information according to a respective key word of the different key words;

distributing, by the management super peer, the classified resource information according to the respective key word; and storing, by the index super peer, the distributed classified resource information when the distributed classified resource information is received by the at least one index super peer.

10. The resource sharing method of claim 8, wherein the transmitting of the resource request message to the at least one second edge peer comprises:

transmitting, by the index super peer, the resource request message to the second management super peer that manages the at least one second edge peer; and transmitting, by the second management super peer, the resource request message to the at least one second edge peer when the resource request message is received by the second management super peer.

11. The resource sharing method of claim 7, wherein the determining of the representative key word comprises:

computing an appearance frequency of the extracted key words, using a number of the collected resource information and the computed number of appearances, according to:

$$p(k) = \frac{O(k)}{\sum_{k=1}^{n}},$$

where O(k) denotes the computed number of appearances, and p(k) denotes the computed appearance frequency; and determining the extracted key word to be the representative key word when the computed appearance frequency exceeds a previously set reference value.

12. A resource sharing system, the system comprising:

a plurality of edge peers that individually store a resource, a management super peer that manage the plurality of edge peers, and a plurality of index super peers that index resource information, received from the management super peer and corresponding to a previously set condition, including a name of the resource that includes at least one key word, wherein each index super peer is allocated a key value range, corresponding to the previously set condition, that is used to determine whether to store the resource information, wherein the name of the resource of the resource information is classified such that a representative key word corresponds to the resource, and the representative key word is selected from among the at least one key word included in the resource name;

the plurality of index super peers that distribute and manage respective resource information for a resource stored by each of one or more second edge peers, according to the representative key word included in each respective resource information, when the respective resource information for the resource stored by each of the one or more second edge peers is collected;

a first edge peer that transmits a resource request message including a search word, for the respective resource information, to the management super peer; and at least one second edge peer that transmits a resource corresponding to the respective resource information to the first edge peer when the resource request message is received by the at least one second edge peer from the management super peer, wherein the management super peer transmits, based on a comparison of the search word and the key word, the resource request message to the at least one second edge peer that stores the resource when the resource request message is received by the management super peer, wherein the method further comprises:

classifying of the resource information by the management super peer comprises:

extracting key words from the collected resource information;

computing a number of appearances of the key words extracted from the collected resource information;

determining the representative key word among the extracted key words using the computed number of appearances; and classifying the collected resource information according to the determined representative key word, wherein the determining of the representative key word comprises:

determining the extracted key word to be the representative key word when the computed number of appearances exceeds a previously set reference value.

13. The resource sharing system of claim 12, wherein the management super peer transmits the resource request message to the index super peer when the resource request message is received by the management super peer from the first edge peer, and the index super peer transmits the resource request message to the at least one second edge peer when the resource request message is received by the index super peer from the management edge peer.

14. The resource sharing system of claim 13, wherein different key words are allocated to each of plural index super peers, including the index super peer, the management super peer classifies the collected resource information according to a respective key word, of the different key words, and distributes the classified resource information according to the respective key word when the resource information is collected, and the index super peer stores the received distributed classified resource information when the classified resource information is received by the index super peer.

15. The resource sharing system of claim 14, wherein the management super peer:

computes an appearance frequency for each extracted key word, using a number of the collected resource information and the computed number of appearances according to:

$$p(k) = \frac{O(k)}{\sum_{k=1}^{n}},$$

where $O(k)$ denotes the computed number of appearances, and $p(k)$ denotes the computed appearance frequency; and determines the extracted key word to be the representative key word when the computed appearance frequency exceeds a previously set reference value.

16. The resource sharing system of claim 13, wherein the super peer further comprises a second management super peer that manages the at least one second edge peer, the index super peer transmits the resource request message to the second management super peer when the resource request message is received from the management super peer by the index super peer, and the second management super peer transmits the resource request message to the at least one second edge peer when the resource request message is received from the index super peer by the second management super peer.

* * * * *